April 12, 1966 NOBORU MORIFUJI 3,245,446

SCREW DRIVER WITH A SCREW HOLDING DEVICE

Filed Sept. 19, 1963 9 Sheets-Sheet 1 noboru Morifuji

April 12, 1966 NOBORU MORIFUJI 3,245,446
SCREW DRIVER WITH A SCREW HOLDING DEVICE
Filed Sept. 19, 1963 9 Sheets-Sheet 2
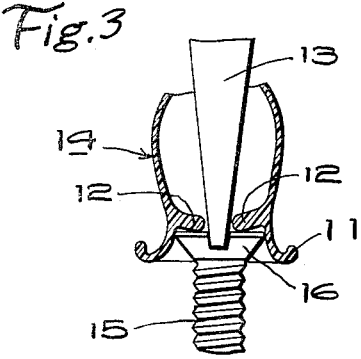
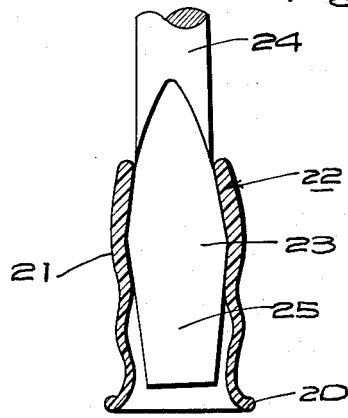
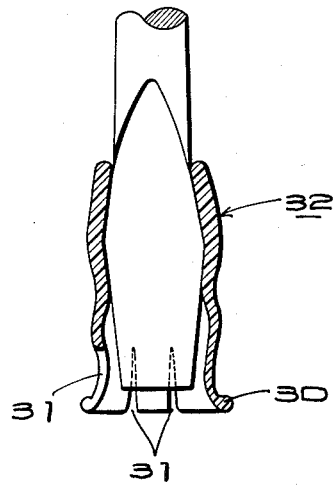
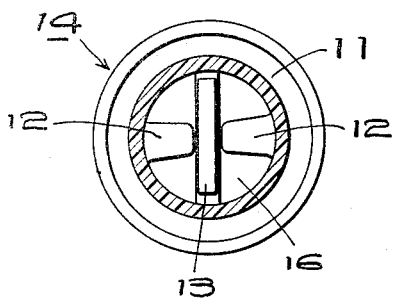
noboru Morifuji April 12, 1966  NOBORU MORIFUJI  3,245,446
SCREW DRIVER WITH A SCREW HOLDING DEVICE
Filed Sept. 19, 1963  9 Sheets-Sheet 3 noboru Morifuji

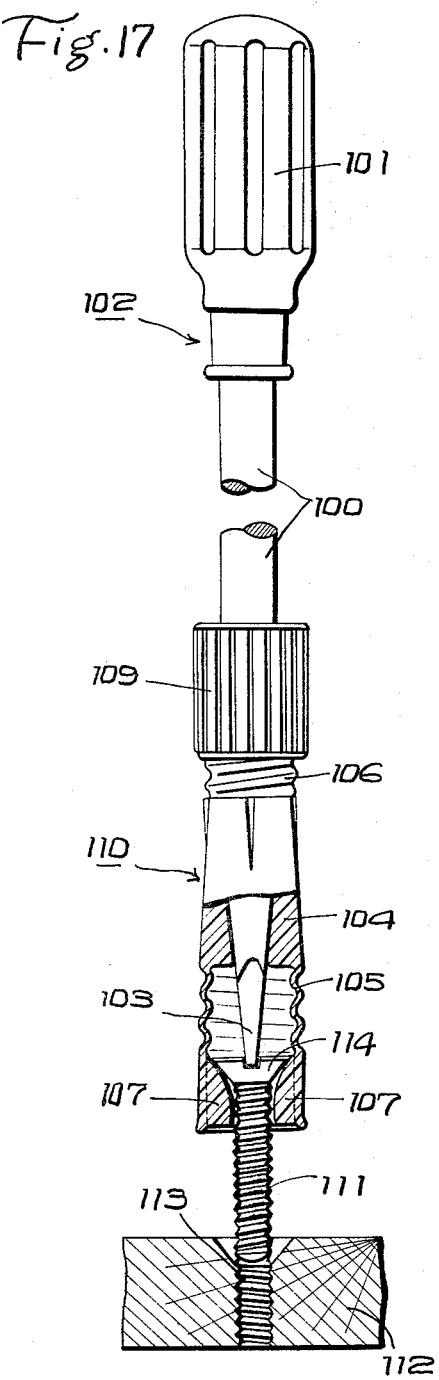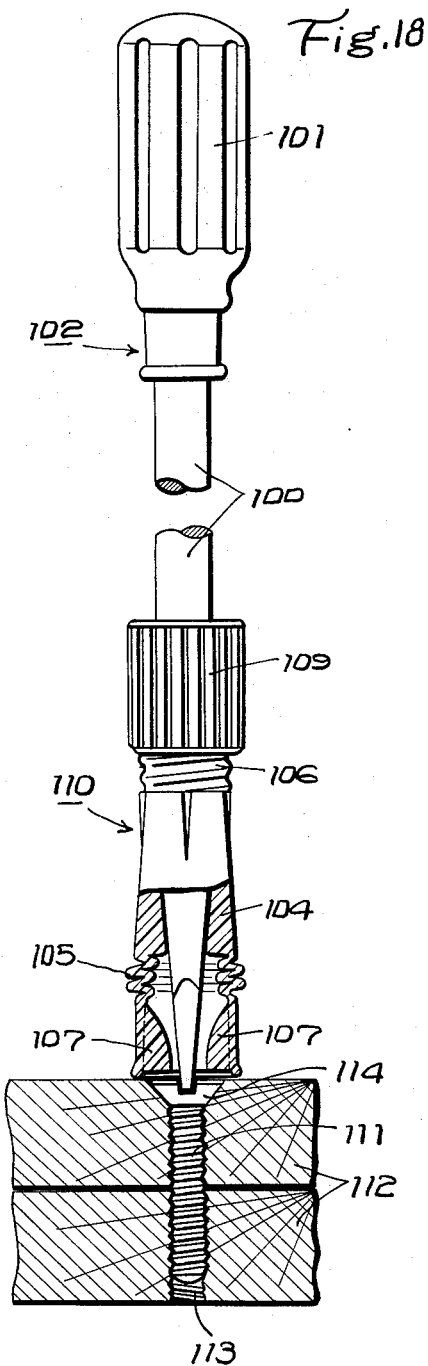

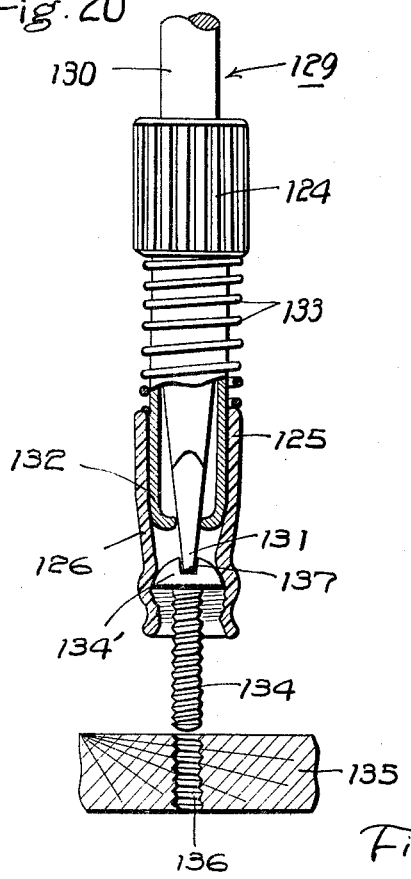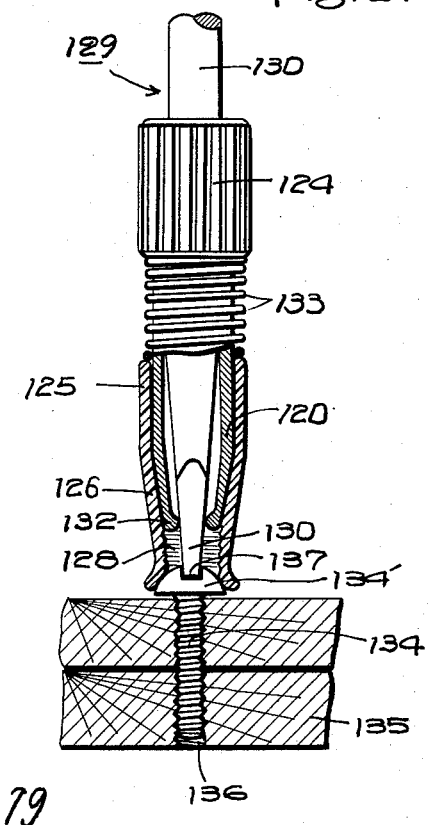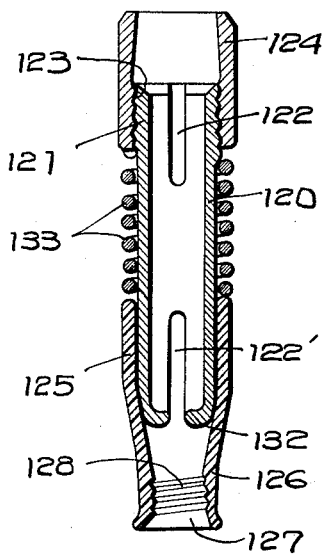

April 12, 1966  NOBORU MORIFUJI  3,245,446
SCREW DRIVER WITH A SCREW HOLDING DEVICE
Filed Sept. 19, 1963  9 Sheets-Sheet 9 noboru morifuji

United States Patent Office 3,245,446
Patented Apr. 12, 1966

1

3,245,446
SCREW DRIVER WITH A SCREW
HOLDING DEVICE
Noboru Morifuji, Nishinomiya-shi, Japan, assignor to The
Kabushiki Kaisha Morifuji Haguruma Seisakusho,
Osaka, Japan, a corporation of Japan
Filed Sept. 19, 1963, Ser. No. 310,115
Claims priority, application Japan, Sept. 23, 1962,
37/54,747
4 Claims. (Cl. 145—50)

*Description in detail of the present invention*

A primary object of the present invention is to provide a screw-driver having a screw holding device which drives a machine bolt, a wood screw, and the like in an object as it holds the screw at its end by means of the screw holding device and which is separable from the screw at the end of the screw tightening operation just as in an easy and simple manner as in the operation of a screw-driver of conventional model without requiring at all to manipulate the screw itself externally.

Another important object of the present invention is to provide a screw-driver with said screw holding device which automatically holds a screw as the latter is loosened or rotated completely out of the holed object, in usual manner.

More specifically, the present invention relates to a screw-driver characterized by a screw holding device which is made of elastic materials, shaped substantially tubular divergently open at one end expanded at a midsection and loosely covering the flat lower end of a screw-driver.

In the construction of a screw-driver of the present invention, as mentioned in the preceding, a wood screw, for example, may be so positioned in place as to be held elastically by the divergent mouth of said screw holding device so that the screw may be ready for being driven in an object with its slotted head properly engaged by the blunt end of the screw-driver, said elastic hold on the screw being releasable at the end of the tightening automatically by elastic deformations of the screw holding device which is also capable of engaging the screw being loosened and retaining it till after it is rotated completely out of the hole.

*Brief explanation of drawings*

FIGURE 3 is a sectional side view of the essential part of the present invention.

FIGURE 4 is a cross sectional plan view of same.

FIGURES 5 and 6 are side views of said essential part cut open in part, respectively.

FIGURES 17 and 18 are a side view of the longitudinal section of same in operations, respectively.

FIGURE 19 is also a side view of the longitudinal section of the present invention.

2

FIGURES 20 and 21 are a similar view to the preceding of the present invention cut open in part, respectively.

Figure 22:
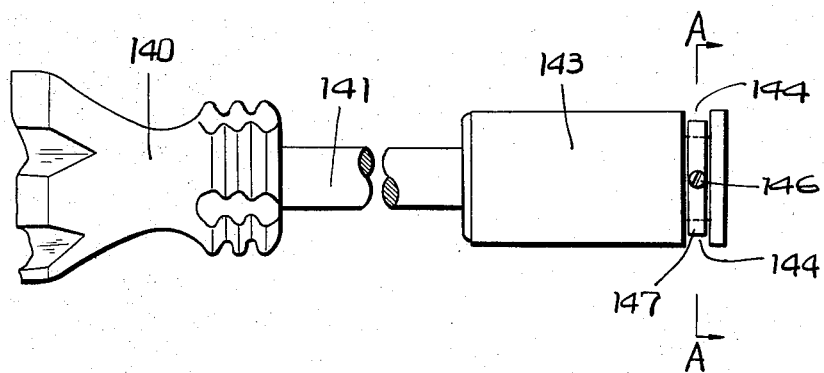

FIGURE 22 is a side view of the present invention with its part cut open.

Figure 23:
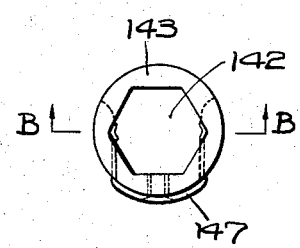
Figure 24:
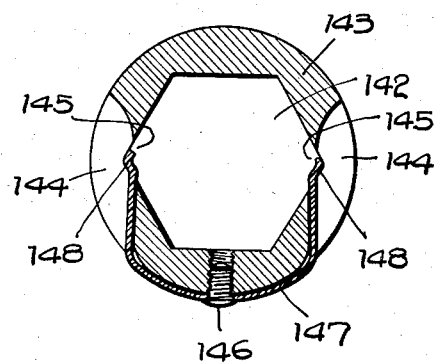

FIGURES 23 through 26 inclusive are a front view of the present invention as shown in FIGURE 22, and enlarged cross sectional views taken along the line A—A in FIGURE 22 and the line B—B in FIGURE 23, in static and operation conditions.

With reference to FIGS. 1–4, an elastic member, which is hollow through, constituting a substantially tubular body, loosely covers the metal part 4 of the screw-driver 6, extending from a little upper side of the flat portion 7 of said metal part 4 longitudinally to a length slightly beyond the extreme end thereof. Said elastic member has its upper end tied and braced about said metal part 4 of the screw-driver 6 by wire means 8 overlapped by a metal band 9 and has its other end left open in a divergent mouth formed continuous from the adjacent tubular section having a diameter which is smaller than the expanded mid-section 2 as shown. Reference character 10 denotes an air vent.

Figure 1:
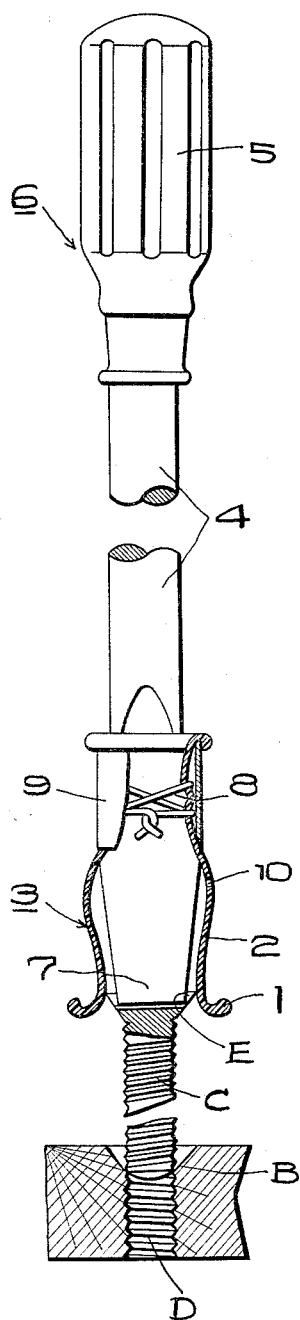
FIGURE 1 is a diagrammatic side view of the present invention showing its part cut open.

When it is desired to tighten a screw C in a threaded hole D provided in a fixed object B, the slotted head portion 16 of the screw 15 is previously placed in engagement with the flat end portion 25 of the screw-driver 6 so that the screw-head 16 may be elastically retained at the reduced neck part adjacent the divergent mouth of said tubular member 3 as illustrated in FIGURE 1, and said screw 15 thus retained by the screw-driver 6 is turned in one direction into said threaded hole D in the fixed object B.

Figure 2:
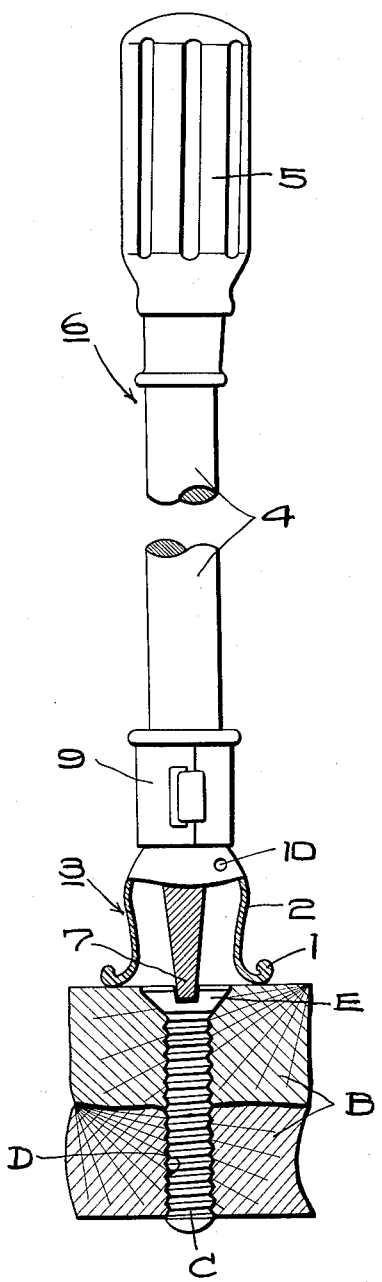
FIGURE 2 is a digrammatic front view of the present invention showing its part cut open.
Figure 7:
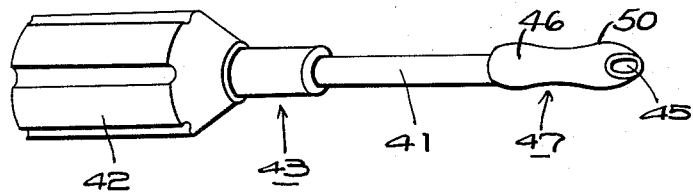
FIGURE 7 is an oblique view of the present invention.
Figure 8:
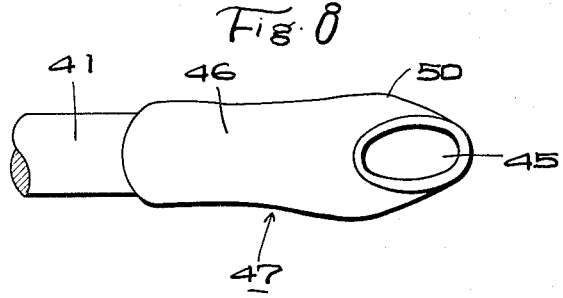
FIGURES 8 to 10 are respectively enlarged oblique, sectional and end views of the construction as shown in FIGURE 7.

Upon driving the screw 15 in the threaded hole D in the fixed object B until its top surface is flush with said object B, said divergent mouth 1 radially expands, by its own elasticity, upon contact with the surface of said object B, and simultaneously releases the screw-head 16 from the clasped position, as shown in FIGURE 2.

When it is desired to remove a screw from the tightened position, said tightening procedure is merely reversed, wherein said divergent mouth 1 is pressed against the surface of said object B whereby to be radially expanded, while on the other hand the flat end portion 25 of the screw-driver 6 is fitted in the head portion 16 of the screw 15 to turn the latter in the loosening direction until the screw 15 is completely out of the threaded hole D in the fixed object B, when said divergent mouth 1 loses no time to recover its elastic displacement to automatically engage the screw head 16 and retain it till after it is bodily out of the threaded hole D as shown in FIGURE 1, thus the operation being feasible with ease and automatically, without requiring any manipulation on the screw 15 itself.

The present invention embodying the above construction and performance, therefore, offers possibilities of using it very simply, i.e., the head portion of a machine bolt, or a wood screw or the like put in position at the end of the screw-driver can be driven in holes in any intricate corners or recessed locations of difficult access, with accompanying advantages of such convenience in taking out a tightened screw in such locations as just mentioned in exactly the same way as by a usual type screwdriver, yet with a very efficient, automatic effect of holding the screw being removed, and retaining it, till after out of the hole, at the end of the screw-driver, all this being accomplished by a screw-driver which is easy to manufacture, simple in the construction, and little different from the commonly used type only except in said elastic tubular device.

In FIGURE 5, a removable or easily replaceable type of elastic tubular device is offered, whereof the construction is such that the inside diameter of the expanded midsection 21 of the tubular device is somewhat reduced, as hereinbefore mentioned, to be shown as a modified form of elastic tubular device 22 which has a lipped mouth section 20 with its neck part remaining same as before; and this modified elastic tubular device 22 is sleeved tightly over the part 23 of the flat metal portion 24 of the screw-driver 6, where the transverse length is largest so that the tubular section 21, on account of its elasticity, closely fits over the surface of said part 23 of the screw-driver's metal portion 24, and therefore, said elastic tubular device 22 can be readily and very conveniently attached to or detached from the screw-driver from the end of the flat metal portion of the latter.

In FIGURE 6 is shown another different model of the present invention, where a plurality of longitudinal V-shaped cuts 31 are provided in the wall of said lipped mouth section 30 of the elastic tubular device 32 illustrated in FIGURE 5 by way of facilitating the latter's elastic deformity to the advantage of taking up a screw of various different sizes.

Figure 9:
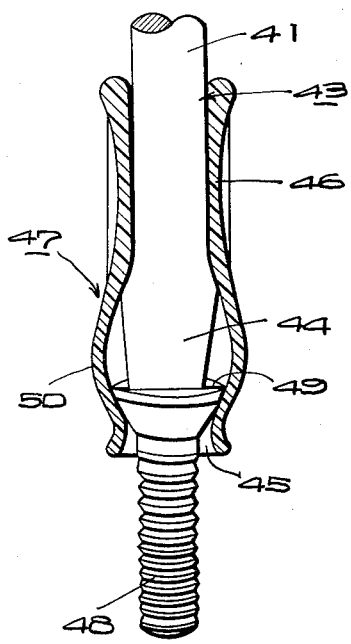
Figure 10:
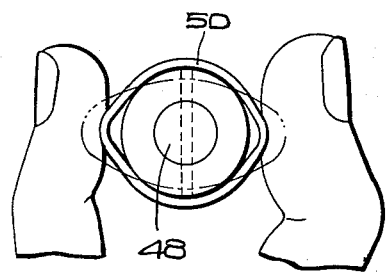

In FIGURES 7 to 10 are shown still another example of application of the present invention respectively, where an elastic tubular device 47 which extends from a little upper side of the flat 44 metal portion 41 of the screw-driver 34 longitudinally to a length slightly beyond the extreme end of the flat metal portion 44, is provided with a divergent mouth section which is elliptical in cross section. In order for the slot 49 in the head of a screw to be first placed in position in engagement with the blunt end 44 of the screw-driver 43 as shown in FIGURE 9, and then rotated into or out of an object as required by operating the grip portion 42 of the screw-driver, the section 59 of the elastic tubular device 47, where the diameter is larger than that of the remaining part, is pressed inwardly from both sides by use of two fingers, as illustrated in FIGURE 10, this in turn causing said neck section, which is reduced in diameter and located a little inside of said mouth section 45, to relatively expand so that the screw-head may be given easier access into the tubular member, and when said section 50 is released from said finger pressures to the result of its recoveries of elastic displacement, said neck section holds the admitted screw tightly in position The elastic tubular device in this application is composed of different diameters in its cross sections, wherein a certain tubular section of the elastic tubular member, has the wall surface nearer than the remaining section to the longitudinal center of the elastic tubular member, and the wall of said certain tubular section will be forced to expand by passage therethrough of the rod portion of a screw-driver inserted, thereby resulting in the elastically engaging the upper part of said rod portion of the screw-driver. This arrangement, therefore, will make it possible to removably use only one single size of said elastic tubular member designed to have different diameters in cross sections for holding a screw-driver of different sizes in thickness of the metal portion of a screw-driver, without requiring to have ready at hand a stock of such elastic tubular members in a variety of sizes for selection for a job where screw-drivers of different sizes are used.

Figure 11:
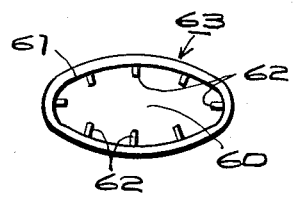
FIGURES 11 and 12 are an enlarged front view of said essential part of the present invention, respectively.
Figure 12:
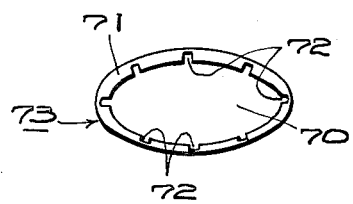

The elastic tubular member shown in FIGURE 11 is of further different construction in the screw retaining mouth section in comparison with those shown in FIGURES 7 to 10, where said screw holding mouth 60 having the wall 61 formed to an elliptical shape is provided with a plurality of elastic elements 62 projecting radially inward in spaced relation along the interior wall surface of the screw holding mouth 60. The elastic tubular member 63 shown in FIGURE 12 is provided with a plurality of rectangular notches 72, . . . cut in spaced relation in the lip 71 of the elliptical mouth 70 to a suitable depth radially outward from the interior edge.

Figure 14:
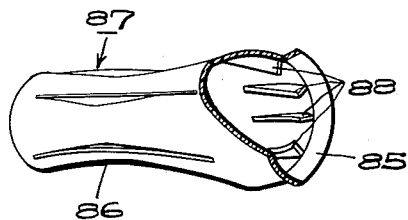
FIGURES 14 and 15 are an enlarged oblique view of the essential part cut open in part of the present invention as shown in FIGURE 13, and an enlarged side view of same in operations, respectively.
Figure 13:
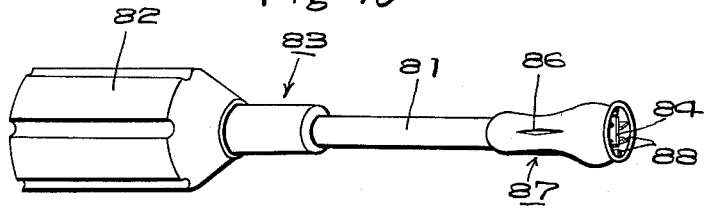
FIGURE 13 is an oblique view of same.
Figure 15:
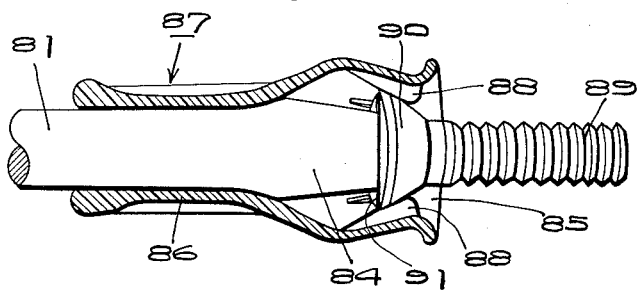

In a further different model of the present invention as shown in FIGURES 13 to 15, the elastic tubular member 81 is open at one end in an elliptical form 85 with outwardly turned lip portion provided along the edge; comprises a neck section which is reduced in diameter adjacent said lipped mouth section 85 and formed continuous from an expanded mid-section 86; and extends longitudinally from a little upper side of the flat 84 metal portion 81 to a length slightly beyond the pointed end of the screw-driver 83, said lipped mouth section 85 being provided with a plurality of elastic elements 88 projecting radially inward from the interior wall surface.

With a screw-driver of the above-mentioned construction, a machine bolt 89, for example, is placed in a position as shown in FIGURE 15 with the slotted head 91 engaged by the blunt end 84 of the screw-driver 83 and then rotated into or out of an object by turning the handgrip 82 as required, wherein said elastic tubular device 87 functions to elastically hold tight by the aid of its elastic elements 88 the head portion 90 of said screw 89 which is thereby securely placed in abutting engagement with the screw-driver 83 and the screw may be very conveniently carried as it is retained at the end of the screw-driver and rotated into or out of holes located in any awkward corners of a place without requiring to manipulate the screw itself during the operations.

A little before the end of tightening a screw into an object, the tongue elements 85 of said elastic tubular member 87 fall out to come in contact with said object, whereas for the part of said elastic tubular member, it has to be pressed tightly against the surface of said object at the beginning of the operation of loosening a tightened screw 89 out, wherein however, said elastic tubular member 82 will discharge its functions satisfactorily by the virtue of its elastic deformability in the direction either longitudinal or transverse thereof.

In this example, said elastic tubular member is capable of elastically holding a screw-head engaged by the blunt end of the driver by the aid of its inwardly projecting tongue elements 85 and thus carrying it to anywhere of difficult access for tightening operations, without requiring at all to finger it externally. And when the screw-driver is withdrawn from the screw that has been tightened, said tongue elements of the elastic tubular member are also separated from the screw in safety with the latter remaining as it is tightened in the hole.

Similarly on the occasion of loosening a screw out the screw-driver's end is fitted in the slot of the screw-head and as the screw comes out of the hole, said elastic tongue elements will come in to retain the screw being loosened, thus enabling the screw-driver to complete the job of rotating the screw out. Further with said arrangement, the elastic tubular member will be capable of handling a screw or a screw-head of almost any size, big or small, since said elastic tongue elements will adapt themselves to any elastic deformations required, this of course sufficing it to use only one single screw-driver of the present invention for screws or screw-heads of various different sizes on both occasions of screwing and unscrewing operations, wherein the screw will always be assured to be picked up by the screw holding device as its begins to be loosened and retained till after completely out from an object. This is a big advantage featuring the present invention.

Figure 16:
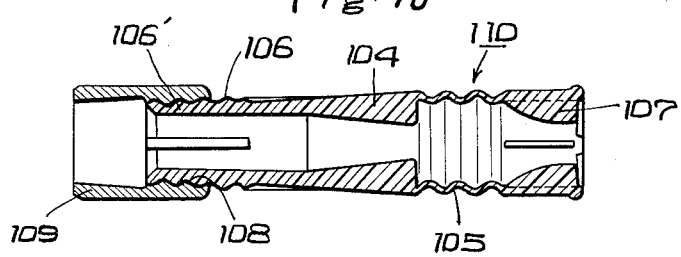
FIGURE 16 is a side view of the longitudinal section of the present invention.

In FIGURES 16 to 18 is shown another example of the present invention, where the elastic tubular member 104 is sleeved over the screw-driver 102, extending longitudinally from a little upper side of the flat 103, metal part 100 to a length slightly beyond the blunt end of the screw-driver, and consists of a bellows section 105, an externally threaded convergent section 106, and a straight tubular section, said bellows section being provided a little upper side of the lower end of the elastic tubular member 104, said externally threaded convergent section 106 being provided adjacent the upper end of said elastic tubular member 104 and comprising a plurality of slits 106' cut in its wall in spaced relation thereabout in the direction substantially parallel to the longitudinal axis of the tubular member 104, and said straight tubular section extending from the substantially central part of the elastic tubular member 104 in opposite directions, one half upwardly to the lower boundary of said externally threaded convergent section 106 and the other half downwardly to the upper boundary of said bellows section 105. In this structure, said elastic tubular member 104 tightly covers the flat metal part 103 of the screw-driver 102 in a form conforming to the surface of the metal part 103, and has at its open lower end a plurality of screw holding elements 107 which project integrally of, and in spaced relation along, the inner side of the wall that is defined between the plane of the section of the open extremity of the elastic tubular member 104 and that of the lower boundary of said bellows section 105, and which approach nearer to the metal part 100 of the screw-driver 102 in their extending direction toward the open lower end of said elastic tubular member 104. Another elastic tubular member 109 which is internally threaded and convergently open at one end, is sleeved, before said tubular member 104, over the screw-driver 102 from the pointed end of the latter so as to tightly engage in screw pair with said externally threaded convergent section 106 of the elastic tubular member 104 to the effect of narrowing the space between said slits 106' provided in said externally threaded section 106, thus completing a unit of screw holding device of elastic tubular members 110 securely attached to the screw-driver 102.

In this example, the screw-head 114 is inserted in the device 110 from the open end of the latter until the screw 111 engages the flat end 103 of the screw-driver 102, when said screw-head 114 compresses said bellows section 105 upwardly through said screw-head retaining elements 107 and as the screw-head 114 is pushed in sufficiently deep where it becomes free from resistance by said screw-head retaining elements 107, said bellows section 105 is released resiliently from said compressed state so that the screw-head 111 is elastically held tight by said elements 107, and subsequently is fitted, and driven on in, the threaded hole 113.

When the screw 111 has been driven its full length in the threaded hole 113, the screw-head becomes flush with the surface of the holed object 112, whereby said bellows section 105 is compressed upwardly as a consequence of contacts between the open end of the elastic tubular device and the surface of said object 112 and said screw-head retaining elements 107 are also raised upwardly along the axis of the screw-driver in sliding contacts with the screw-head 114 until they quit hold of the screw automatically.

For unscrewing operations, said procedure is reversed, i.e. as shown in FIGURE 18, the open end of the elastic tubular device is pressed against the surface of the object in which the screw is tightened, causing the bellows section 105 to be compressed. The blunt end 103 of the screw-driver 102 is then fitted in the screw-head 114 and the screw is turned out from the threaded hole 113. Directly the removal of the screw is started, the bellows section 105 will begin to recover its elastic displacement, thereby enabling the open end of the screw holding device 104 to seize the screw-head 114 and retain it at the end of the screw-driver 102 as shown in FIGURE 17, all this being done automatically and without requiring to manipulate the screw itself separately, thus allowing very easy unscrewing operations.

To sum up the foregoing, it is secured in the present invention by providing a screw-driver with said device and construction to tighten a machine bolt, a wood screw, or the like in a simple manner by means of a screw holding device attached to the end of a screw-driver, wherein the elastic screw holding device is partly formed in an externally threaded section and a bellows section so that with the head portion of a machine bolt or a wood screw being forced in against the elastic resistance of said bellows section, the bellows section will be compressed axially upward, and no sooner had the screw-head been wholly allowed in, the bellows section recovers its elastic displacement so that the screw will be held tight by the elastic action of the mouth of the screw holding device, thus allowing easy and simple screw tightening operations in any intricate corners, or other places of difficult access, and further, as the screw is driven on for tightenings, said bellows section of the screw-holding device is compressed more and by its own resilient power, tends to push the screw out, this helping greatly for screw tightening operations, and that at the end of the operations, the screw-driver can be disengaged from the tightened screw without requiring at all to manipulate the screw itself.

For removal of a tightened screw, a screw-driver of the present invention is operated in same ordinary manner as conventional ones, where said bellows section being compressed, the open end of the screw holding device will accordingly be maintaining its position as pressed downward, and as the screw is rotated out, the screw holding device seizes and retains the screw by the virtue of its own elasticity. This automatic action of holding a screw at the end of the screw-driver allows very efficient screw driving operations. The elasticity of the screw holding device is a very desirable advantage because it allows the screw's being pushed in against the elastic resistance of the screw holding device so that the screw may be held tight regardless of a difference in the size of its head.

Reference will be made to another different example of the present invention which is shown in FIGURES 19 to 21, wherein an inner tubular member 120 of elastic materials has an externally threaded section 121 about the wall 121 adjacent the upper end portion, and is provided with slits 122 cut substantially parallel with the longitudinal axis of said externally threaded section 121, while on the other hand, in the wall adjacent the opposite or lower end portion of said inner elastic tubular member 120 are provided longitudinal slits 122' which are cut in diametrically opposite relation, where said externally threaded section 121 is engaged by an internally threaded section 123 of an outer elastic tubular member 124. Besides, a second outer elastic tubular member 126 is provided in this example, which has its one end slidably sleeved over the lower end of said inner tubular member 120 and from there continuously, has its remaining part 126 converging into a section of a reduced diameter and then terminating in a divergent annular opening 127 inside of which are provided non-skid grooves 128.

The procedure of assembling the above-mentioned elastic tubular members are as follows.

After said first outer tubular member 124, said inner tubular member 120, with its threaded section being directed toward the upper side of the screw-driver 129, is sleeved over the metal part 130 of the screw-driver, from the latter's flat end 131, when said outer tubular member 124 is threaded onto said externally threaded section 121 of said inner tubular member 120 to the effect of tightening about the latter by narrowing the space between said slits 122 so that said inner tubular member 120 in turn is tightly secured about the metal part 130 of the screw-driver 129.

The second outer tubular member 125 is sleeved so as to be able to slide longitudinally over the lower end proximity 132 of said inner tubular member 120 over which a spring means 133 is sleeved interposed longitudinally between said first outer tubular member 124 and said second outer tubular member 125.

When it is desired to tighten a machine bolt or a screw 134 in a threaded hole 136 of a fixed object 135, the flat metal part 131 of the screw-driver 129 is previously fitted in said slits 122' of said inner tubular member 120 so that the inner tubular member 120 is rotated together as the screw-driver 129 is turned, as shown in FIGURE 20, and then the screw-head 134' is inserted in the mouth 126 of said second outer tubular member 125 so that the slot 137 in the screw-head may engage the blunt end of the screw-driver 129 and the head portion 134' of the screw 134 be held tight by the elastic action of said second outer tubular member 125 in cooperation with said non-skid grooves 128, and subsequently, the screw 134 is fitted in the threaded hole 136 to be driven on into it. As the screw 134 is rotated and its head portion 134' approaches the surface of the holed object 135, said divergent mouth 126 of the tubular member 125 comes in contact with the surface of said holed object 135 to be pressed upwardly overcoming the resiliency of said spring means 133. Consequently, said divergent mouth section 126 of the tubular member 125 will be subjected to downward pressures by said spring means 133, and the screw 134 under elastic holding by said divergent mouth section 126 will also be under downward pressures, this assuring very easy subsequent operations of tightening the screw.

As the screw 134 thus tightly held by the divergent mouth section 126 is rotated downward into the holed object 135 until its head portion is flush with the surface of the latter, said mouth section 126 is pushed upwardly along the metal part of the screw-driver as it retains the screw 134 still at the end of the screw-driver, and in the meantime, the screw is automatically released from the elastic mouth section 126 as the screw head becomes flush with the surface of the holed object 135.

When it is desired to take out a tightened screw 134, the mouth section 126 of the tubular member 125 is first pressed downward against the surface of the object 135, which will cause said mouth section 126 to be pushed upward resistively against the pressure of the spring means 133 as shown in FIGURE 21, whereby the blunt end 131 of the screw-driver is enabled to fit in the screw-head 134.

As the screw 134 is rotated out of the hole, said mouth section 126 will be pushed downward by the resiliency of the spring means 133, whereby the screw-head 134' is automatically plucked up into the mouth section 126 to be seized elastically by the tubular member 125 and retained at the end of the screw-driver till after the screw is bodily out from the hole; namely, the screw is automatically plucked up and easily rotated out of the hole as it is retained at the end of the screw-driver so conveniently.

In the construction described in the preceding, means is provided to hold a screw at the end of a screw-driver by use of a screw holding device attached to the screw-driver, wherein a spring means is introduced interposed longitudinally between one of the elastic tubular members, which functions to hold a screw and the stepped lower boundary of another elastic tubular member which covers the main axis of the screw-driver, the former elastic tubular member being provided adjacent the lower flattened end of the screw-driver and slidable longitudinally over the inner tubular member a fixed amount of distance with respect to the lower end of a driven screw, whereby said spring means will contract to the side of its upper end as the screw is pushed into the screw holding mouth of said elastic tubular member, while directly the screw-head is plucked up sufficiently deep into said mouth of the tubular member, the latter recovers its elastic displacement by the action of said spring means to result in the screw-head being elastically held tight by said elastic tubular member, thus assuring very easy screw-tightening operations in any recessed corners or other places of difficult access. In addition, there is no need throughout the operation to use other external means of handling the screw itself, because as the screw is rotated into the hole, said spring means is compressed as described and consequently it works to press said screw holding mouth of the elastic tubular member downwardly, thereby urging the screw into the threaded hole to help greatly for further tightenings, same advantage being the case in the reversed or unscrewing operations too, wherein a tightened screw can be removed by the mere act of the screw-driver of the present invention being operated in just the same ordinary manner as by a conventional model, and at the start of such operations, on account of said spring means being energized with sufficient resiliency under compression, the screw holding tubular member is pressed downwardly at all times to wait for the screw coming out and hold it tightly by its own elasticity. Thus the facility to automatically seize and retain a loosened screw at the end of the screw-driver being provided in the present invention, highly efficient operations are made feasible without requiring any alteration in the construction of a screw-driver itself, yet with such advantages as described in a very simple structure which is little different from a screw-driver of common type and easy to manufacture.

Since a screw is pushed in the elastic tubular member against the elasticity of the latter, this further permits the screw-driver to take up a screw of various different sizes.

Figure 25:
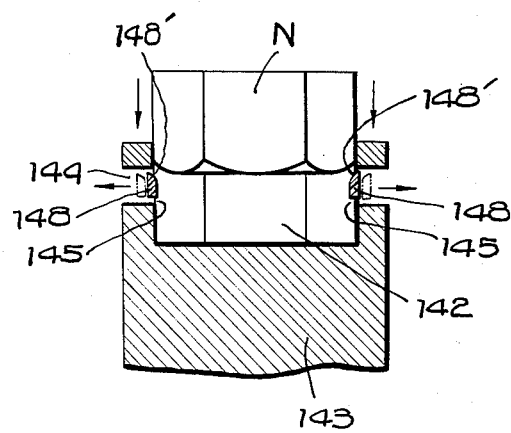

The present invention can be effectively used with a socket wrench, too, as illustrated in FIGURES 22 to 26, wherein a radially expanded cylindrical section 143 provided continuous from the metal rod portion 141 of a socket wrench with a grip 140 is internally formed in a hollow hexahedral socket section 142 which is open at one end, and about centrally of the length of the hexahedral socket section in the outside wall are provided concave grooves 144, 144 in diametrically opposite relation, the inwardly facing bottoms of which are each provided with an aperture opening to said hexahedral hollow space 142 at the corresponding angular corners 145, 145 of the latter, while a substantially U-shaped leaf spring 147 is mounted about one of the two outside wall sections so divided by the presence of said concave grooves 144, 144 and is secured at the center of its length by means of a set screw 146 with the extended both ends being hooked up in said openings made in the bottoms of said grooves 144, 144, said extended ends 148, 148' of the leaf spring 147 terminating within the boundary of the interior wall surface of said hexahedral socket section 142 and being bent at an angle to form a figure substantially conforming to the hexagonal angle contained in the socket section 142 with its inward surface curved divergently of its outward surface as shown in FIGURE 25.

Figure 26:
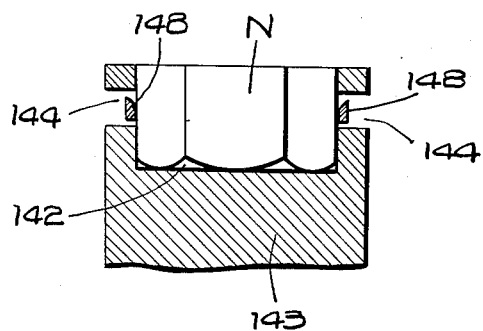

Upon fitting the nut N in said hollow hexahedral space 142, the nut N comes in contact by its diametrically opposite corners with the ends 148, 148' of the leaf spring 146 as illustrated in FIGURES 25 and 26, whereby said ends 148, 148' of the leaf spring 146 are pushed out of their position against their own resiliency so that the nut N may be bodily allowed in the hollow space 142 and held tight from both sides by the resilient leaf spring 147.

With the above-mentioned construction, a nut can be carried to anywhere desired for tightening as it is retained at the end of the socket wrench, irrespective of whether its mating object may be located in an awkward corner or at a lower level in a recess.

Reversely, in the operation of removing a tightened nut, said leaf spring 147 again functions to securely hold the nut N till after the nut N is completely off its mating object.

Unlike a socket wrench of magnetic type, a socket wrench of the present invention comprising the above-described construction can take up, by the virtue of the incorporated resilient means, nuts of such materials as non-ferrous, wherein is required no manipulation or other external means to handle the nut itself which will be safely retained throughout the operation in the socket section of the tool, and besides, the socket wrench is simple in its construction with the device and easy to manufacture, with which quick and easy tightenings as well as removals of a nut can be effected.

What I claim is:

1. A screw driver having a screw driving end, a shank portion and a screw holding device mounted thereon characterized by said screw holding device comprising a tubular member, means mounting said tubular member on the shank portion of the screw driver in axially fixed relation therewith, said tubular member including an elastic recessed end portion adapted to receive and grip the head of a screw and a bellows section inwardly of said end portion for longitudinal flexibility, said end portion being elastically urged to a normal position extending beyond said screw driving end of the screw driver and being flexible longitudinally and radially relative thereto, said end portion having an outwardly flared mouth expandable and contractable radially in response to axial movement of the end portion inwardly from and outwardly to said normal position respectively whereby said device is self-releasing from the head of a screw being tightened by the screw driver and self-engaging with the head of a screw being loosened by the screw driver.

2. A screw driver and a screw holding device as claimed in claim 1 wherein said elastic recessed end portion is provided with a plurality of ribs extending longitudinally and radially inwardly thereof.

3. A screw driver and a screw holding device as claimed in claim 1 wherein the means mounting said tubular member on the shank portion of the screw driver comprises an externally threaded portion on said tubular member and an internally threaded collar engaging and clamping said threaded portion on the screw driver shank portion.

4. A screw driver and a screw holding device as claimed in claim 3 wherein said threaded portion is provided with longitudinally extending slits and wherein said collar is formed of elastic material.

References Cited by the Examiner

UNITED STATES PATENTS

| | | |
|---|---|---|
| 797,078 | 8/1905 | Shelton. |
| 1,360,500 | 11/1920 | Coll. |
| 2,723,694 | 11/1955 | Ross. |
| 2,805,594 | 9/1957 | Fogel _____ 81—125 |
| 2,869,237 | 1/1959 | Berbe. |
| 2,985,208 | 5/1961 | Hibbard. |

FOREIGN PATENTS

| | | |
|---|---|---|
| 639,498 | 4/1962 | Canada. |

WILLIAM FELDMAN, *Primary Examiner.*

MILTON S. MEHR, *Examiner.*